(12) United States Patent
Chang

(10) Patent No.: US 6,776,905 B2
(45) Date of Patent: Aug. 17, 2004

(54) MAGNETIZING AND ACTIVATING PROCESSING UNIT FOR LIQUID MATERIAL

(76) Inventor: Jen-Pen Chang, No. 252, Wu-Kuang Rd., Wu-Jih, Hsiang, Taichung County (TW)

( * ) Notice: Subject to any disclaimer, the term of this patent is extended or adjusted under 35 U.S.C. 154(b) by 175 days.

(21) Appl. No.: 10/209,867

(22) Filed: Aug. 2, 2002

(65) Prior Publication Data

US 2004/0020835 A1 Feb. 5, 2004

(51) Int. Cl.[7] .................................................. C02F 1/48
(52) U.S. Cl. ...................................... 210/222; 210/232
(58) Field of Search ................................. 210/222, 232, 210/223, 695

(56) References Cited

U.S. PATENT DOCUMENTS 5,573,664 A * 11/1996 Kuo ........................... 210/222
5,882,514 A * 3/1999 Fletcher ...................... 210/222
6,299,768 B1 * 10/2001 Okamoto .................... 210/222

* cited by examiner

Primary Examiner—David A. Reifsnyder
(74) Attorney, Agent, or Firm—Troxell Law Office PLLC

(57) ABSTRACT

Magnetizing and activating processing unit for liquid material, including a flow conducting tube, at least one rest body formed with insertion dents and disposed in the flow conducting tube, permanent magnets inlaid in the insertion dents of the rest body, an outer tube fitted around the flow conducting tube and outer tube connectors formed with bypasses and connected with two ends of the outer tube for sealing two open ends of the flow conducting tube. A spiral conducting plate is disposed around the flow conducting tube. A liquid material flows through and is conducted by the spiral conducting plate, whereby the liquid material many times goes through the magnetic field effect of the permanent magnets and is strongly magnetically infiltrated. Therefore, a magnetized and activated water can be produced.

11 Claims, 6 Drawing Sheets

MAGNETIZING AND ACTIVATING PROCESSING UNIT FOR LIQUID MATERIAL

BACKGROUND OF THE INVENTION

The present invention is related to a magnetizing and activating processing unit for liquid material. The magnetizing and activating processing unit is able to produce drinkable activated water helping in health and metabolism. The magnetizing and activating processing unit also is able to produce magnetized water having high cleaning and washing function. In addition, the magnetizing and activating processing unit is able to prevent the mineral salt of the water flow from precipitating and attaching to inner wall face of the water tube. Also, the magnetizing and activating processing unit is able to catch the magnetic material in the liquid fuel.

A magnetizing and activating processing unit for liquid material is able to reduce the hydrogen molecules and oxygen molecules in the liquid and activate the water. Accordingly, the liquid ($H_2O$) is nearly neutral (without carrying any charge) and more similar to the water in the cells of human body. When the activated molecules contact with the organ of human body or a general material, the ability of bacteria to attach to human body is lowered and the activity of the bacteria and viruses on human body is retrained. Also, healthy yeast is produced to avoid abnormal fermentation or decay in bowels. Accordingly, the activated water is able to expedite metabolism and help in health. Taiwanese Utility Model Patent Application No. 79203226 discloses a multifunctional water magnetizing and activating device for producing magnetized water.

It has been proved that the physical and chemical properties of the water flowing through the passage will be changed due to magnetic lines. U. S. Pat. Nos. 3,830,621, 4,188,296, 4,569,237 and Taiwanese Patent Nos. 78102277, 81202936 provide magnetic processing devices for processing liquid fuel so as to enhance combustion efficiency and reduce contamination.

SUMMARY OF THE INVENTION

It is therefore a primary object of the present invention to provide a magnetizing and activating processing unit which is able to produce drinkable activated water helping in health and metabolism.

It is a further object of the present invention to provide the above magnetizing and activating processing unit which is able to prevent the mineral salt of the water flow from precipitating and attaching to inner wall face of the water tube. It is known that the mineral salt dissolved in the water will lead to precipitation of metal material in the water tube or heater. Such metal sediment will clog the water tube and prolong the heating time of the heater. This leads to waste of energy. Therefore, the magnetizing and activating processing unit is able to prevent the mineral salt of the water flow from clogging the water tube.

It is still a further object of the present invention to provide the above magnetizing and activating processing unit which is able to produce magnetized water having high cleaning and washing function. The water molecules of the activated water have high covibration energy, whereby the magnetized water can be used in bath to easily clean up the dirt and prevent bacteria from attaching to the skin. Also, the magnetized water can be used to wash decorative articles such as fingering, earring, etc. After washed, the articles will be renewed and have brightness.

It is still a further object of the present invention to provide the above magnetizing and activating processing unit which is able to catch the magnetically conductive material in the liquid fuel so as to reduce friction against the engine. This affects the exhaust gas and fuel consumption and strengthens the power.

The present invention can be best understood through the following description and accompanying drawings wherein:

DETAILED DESCRIPTION OF THE PREFERRED EMBODIMENTS

Figure 1:
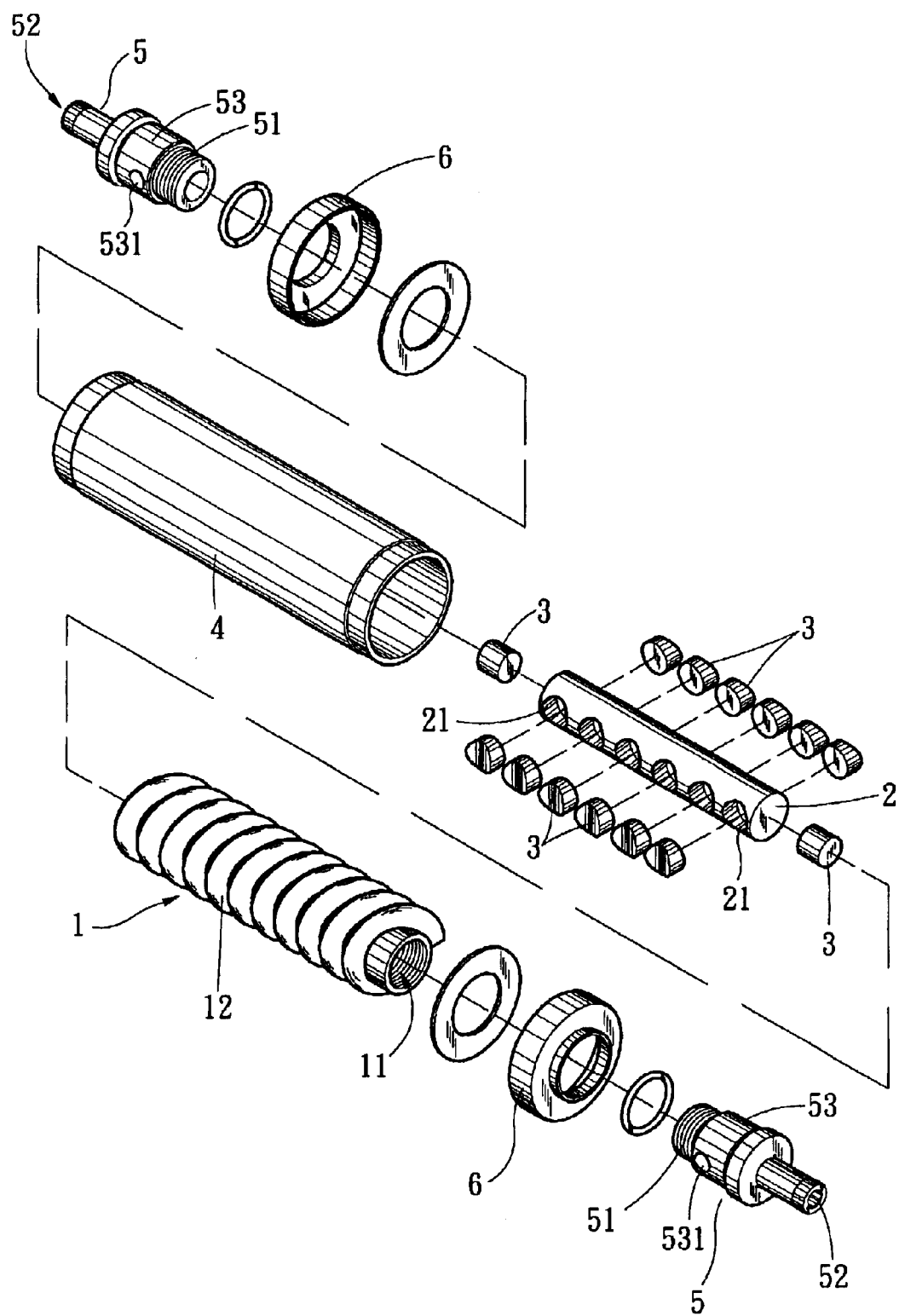
FIG. 1 is a perspective exploded view of a first embodiment of the present invention.
Figure 2:
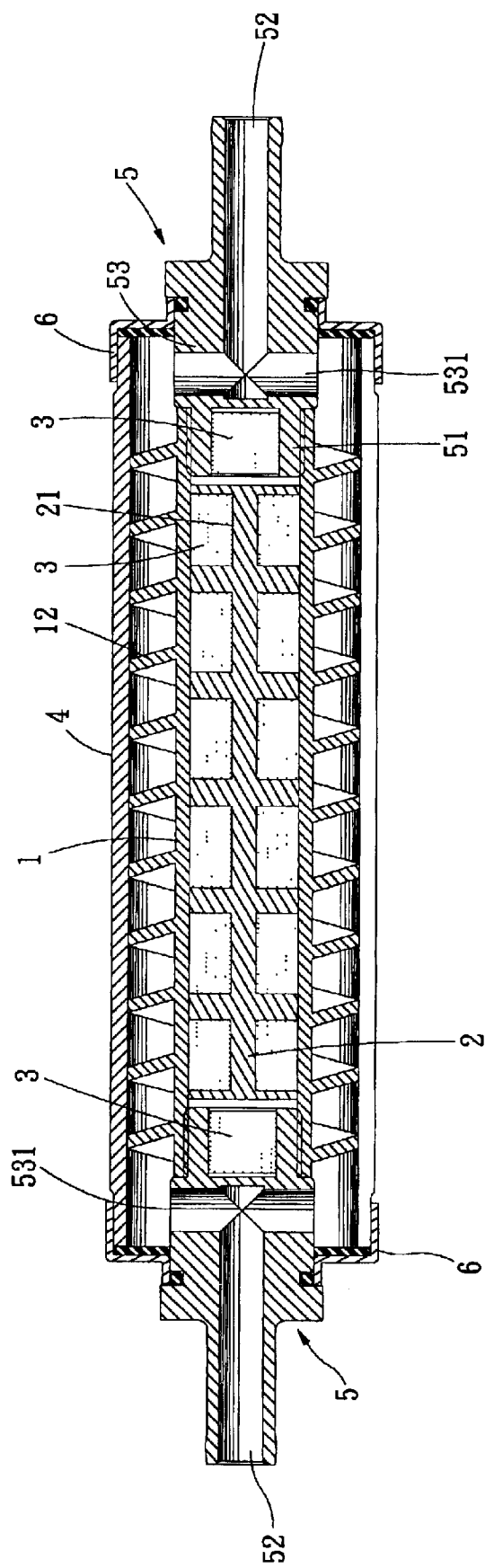
FIG. 2 is a sectional assembled view according to FIG. 1.

Please refer to FIGS. 1 and 2. The present invention includes a flow conducting tube 1, a rest body 2, permanent magnets 3, an outer tube 4 and two outer tube connectors 5. The flow conducting tube 1 has a chamber 11 passing through the tube body from front end to rear end thereof. A certain length of spiral conducting plate 12 is wound around at least a part of the flow conducting tube 1. The outer tube connectors 5 are connected with two ends of the outer tube 4. The inner ends of the outer tube connectors 5 seal the openings at two ends of the chamber 11. In a preferred embodiment, the inner end of the outer tube connector 5 is formed with a thread 51 for screwing with the opening of the flow conducting tube 1. The outer end of the connector 5 is formed with an inlet/outlet 52. Between the inner end and outer end of the connector 5 is disposed an abutting end 53 having a bypass 531. The rest body 2 is a cylindrical body and can be placed into the chamber 11 of the flow conducting tube 1. The circumference of the rest body 2 is formed with at least one insertion dent 21. The permanent magnet 3 is placed in the insertion dent 21 of the rest body 2. The outer tube 4 is a sleeve body having an inner diameter at least equal to the outer diameter of the flow conducting tube 1. The assembly of the above components is accommodated in the outer tube 4. The outer tube connectors 5 extend into the openings of two ends of the outer tube 4 and are screwed with two ends of the flow conducting tube 1. A side cover 6 is disposed between each end of the outer tube 4 and the abutting end 53 of the connector 5 to seal the end of the outer tube 4 and define a closed space in the outer tube 4. The inlet/outlet 52 and bypass 531 of the connector 5 serve as water incoming/outgoing openings. The spiral conducting plate 12 of the flow conducting tube 1 snugly tightly abuts against the inner wall face of the outer tube 4.

Figure 3:
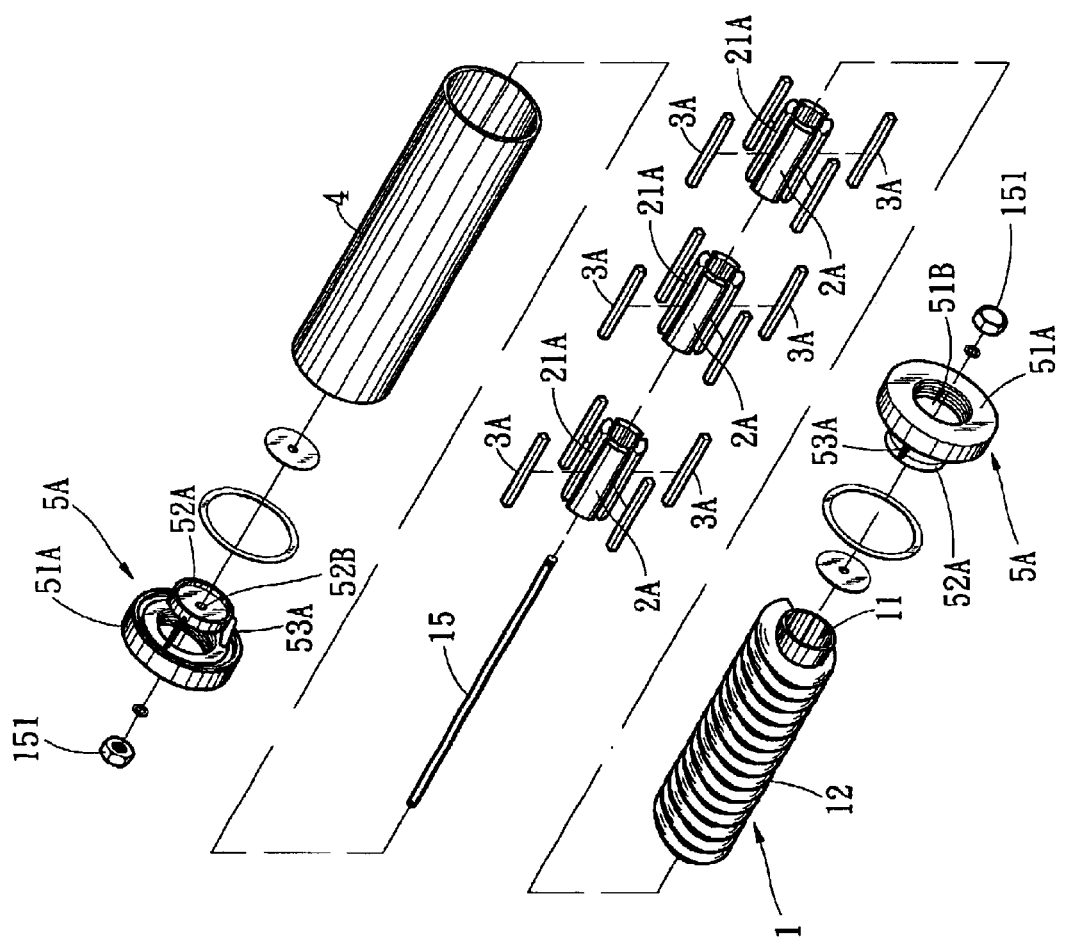
FIG. 3 is a perspective exploded view of a second embodiment of the present invention.
Figure 4:
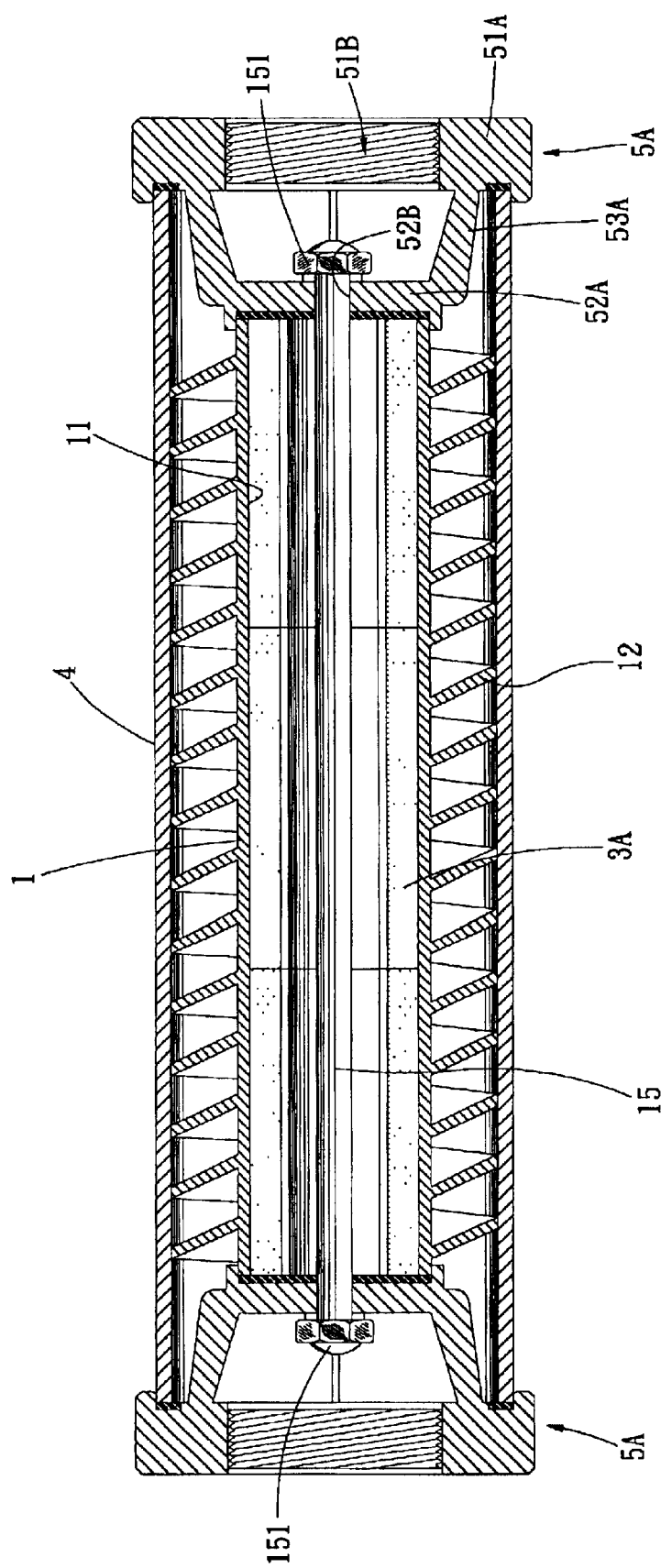
FIG. 4 is a sectional assembled view according to FIG. 3.

FIG. 3 shows another embodiment of the present invention, which is different from the above embodiment in that the rest body 2A is a hollow cylindrical body. The rest body 2A is formed with an axial insertion channel 21A in which the permanent magnet 3A is placed. The outer tube connector 5A is composed of an outer tube sealing cap 51A and an inner tube sealing cap 52A integrally connected with the outer tube sealing cap 51A by several supports 53A. The outer tube sealing cap 51A seals each end of the outer tube 4 and is formed with a central water inlet/outlet 51B. The inner tube sealing cap 52A seals each end of the flow conducting tube 11 and is formed with a central through hole 52B. A central connecting rod 15 is passed through the flow conducting tube 11 and the rest bodies 2A and connected between the two inner tube sealing caps 52A. Two ends of the connecting rod 15 are locked by locking members 151.

Figure 5:
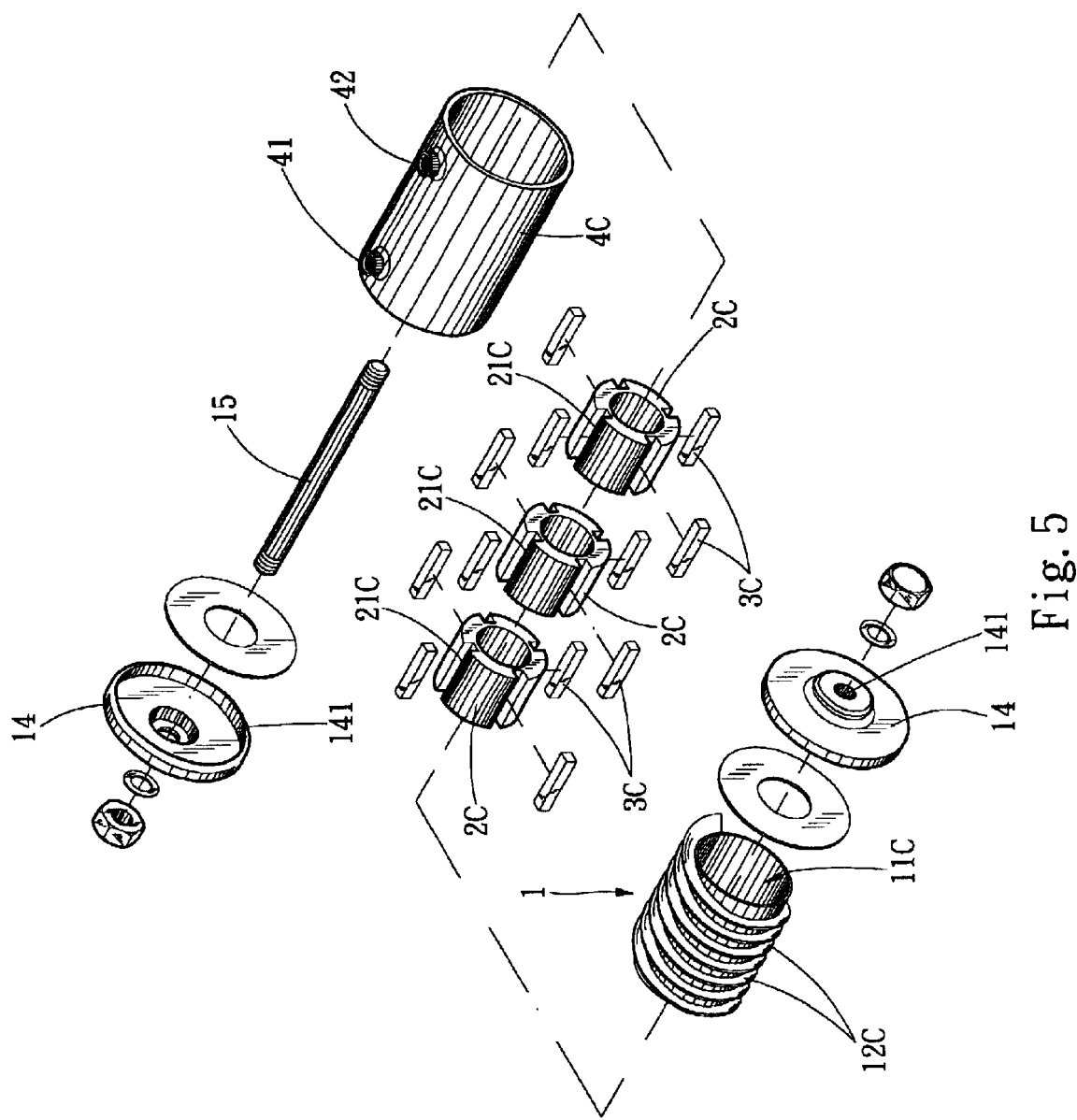
FIG. 5 is a perspective exploded view of a third embodiment of the present invention.
Figure 6:
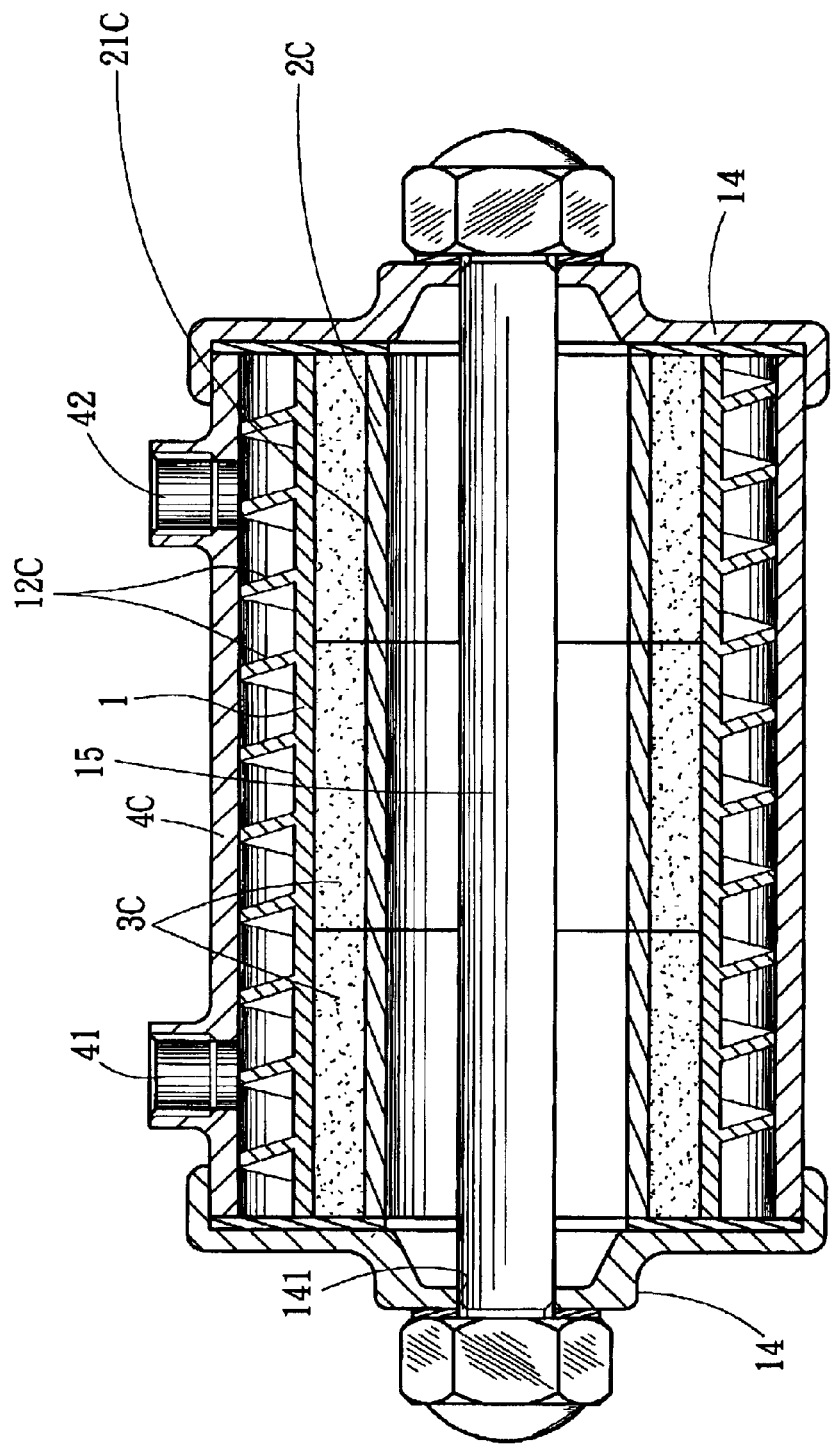
FIG. 6 is a sectional assembled view according to FIG. 5.

FIGS. 5 and 6 show another embodiment of the present invention, in which the flow conducting tube 1C, rest body 2C, magnetic members 3C and the outer tube 4C are identical to those of the second embodiment.

This embodiment includes a flow conducting tube 1C, at least one rest body 2C disposed in the flow conducting tube 1C and an outer tube 4C fitted around the flow conducting tube 1C. The rest body 2C is formed with several insertion channels 21C in which the magnetic members 3C are inlaid. A spiral conducting plate 12C is fitted around the flow conducting tube 1C. The flow conducting tube 1C has a chamber 11C in which the rest bodies 2C are placed. The flow conducting tube 1C is placed into the outer tube 4C. This embodiment is characterized in that a sealing cap 14 formed with a through hole 141 seals each open end of the outer tube 4C. A connecting rod 15 having two threaded ends is passed through the through holes 141 of the sealing caps 14. The two threaded ends of the connecting rod 15 are then tightened. The outer tube 4C is formed with water inlet and outlet 41, 42 near the open ends for connecting with water incoming and outgoing pipelines. When the sealing caps 14 are locked at two ends of the outer tube 4C, the rest bodies 2C and magnetic members 3C are firmly clamped and located. In the second and third embodiments, the connecting rod 15 is passed through the sealing cap 14 and the outer tube sealing cap 41 and tightened. This simplifies the manufacturing and assembling procedure. In addition, the rest bodies 2C and the magnetic members 3C have multistage pattern. This makes it convenient to manufacture these components.

According to the above embodiment, a liquid material can be filled into an opening 52 of the outer tube connector 5. The liquid material will flow from the opening 52 through the bypass 531 of the abutting end 53 into the spiral passage defined between the conducting plate 12 and the inner wall face of the outer tube 4. Accordingly, the liquid material will pass through the space over which the magnetic field is distributed. When the liquid material passes through the space, the liquid material is spiraled through the spiral conducting plate 12 of the flow conducting tube 1. Therefore, the liquid material is many times cut by the magnetic field. Within unit length, the liquid material is more times cut by the magnetic field and then flows out from the other opening 52 of the outer tube connector 5. Accordingly, the fluid is strongly magnetized and activated.

Furthermore, in the third embodiment, the water inlet and outlet 41, 42 are respectively disposed on a lateral side of the outer tube 4C. When many sets of the processing units are connected, the affection on the total length will be reduced. This embodiment can be mobilely used in cooperation with the aforesaid embodiments.

The present invention is advantageous in that the structure is simple and it is easy to assemble the components. Also, the service and cleaning are simplified. Within unit length, the liquid material is more times cut by the magnetic field so that the activation effect is better. The units can be easily linked with each other to achieve higher magnetization effect.

The above embodiments are only used to illustrate the present invention, not intended to limit the scope thereof. Many modifications of the above embodiments can be made without departing from the spirit of the present invention.

What is claimed is:

1. Magnetizing and activating processing unit for liquid material, comprising a flow conducting tube, rest bodies, permanent magnets, an outer tube and outer tube connectors, wherein:

the flow conducting tube has two openings at two ends and has an internal chamber passing through the tube body from front end to rear end thereof, a certain length of spiral conducting plate being wound around at least a part of the flow conducting tube;

the rest bodies can be placed into the chamber of the flow conducting tube, each of the rest bodies being formed with multiple insertion dents in which the permanent magnets are inlaid;

the outer tube connectors are connected with two ends of the outer tube for sealing the openings of the flow conducting tube; and the outer tube is a sleeve body in which the assembly of the above components is accommodated, the outer circumference of the conducting plate of the flow conducting tube snugly abutting against inner wall face of the outer tube, the inner ends of the outer tube connectors being connected with and sealing the openings of two ends of the flow conducting tube, the connectors at two ends of the outer tube being formed with openings communicating with a flow way between the conducting plate and the inner wall face of the outer tube, whereby a fluid can flow into the opening of one end and then spirally pass through the flow way and then flow out from the opening of the other end.

2. Magnetizing and activating processing unit for liquid material as claimed in claim 1, wherein the rest body is a cylindrical body.

3. Magnetizing and activating processing unit for liquid material as claimed in claim 1, wherein the inner end of the outer tube connector is a threaded end for screwing with each end of the flow conducting tube, the outer end of the connector being formed with an inlet/outlet, between the inner end and outer end of the connector being disposed an abutting end having a bypass.

4. Magnetizing and activating processing unit for liquid material as claimed in claim 1, wherein when the inner end of the outer tube connector is locked with the flow conducting tube, a side cover is disposed between each end of the outer tube and the abutting end of the connector to seal the end of the outer tube.

5. Magnetizing and activating processing unit for liquid material as claimed in claim 1, wherein the outer side of the rest body is formed with axially extending insertion channels and the permanent magnets are elongated bodies adapted to be placed into the insertion channels.

6. Magnetizing and activating processing unit for liquid material as claimed in claim 5, wherein the outer tube connector is composed of an outer tube sealing cap and an inner tube sealing cap integrally connected with the outer tube sealing cap by several supports, the outer tube sealing cap sealing each end of the outer tube and being formed with a water inlet/outlet, the inner tube sealing cap sealing each end of the flow conducting tube and being formed with a through hole, a central connecting rod being passed through the flow conducting tube and the rest bodies and connected between the two inner tube sealing caps, two ends of the connecting rod being locked to firmly assemble the respective components.

7. Magnetizing and activating processing unit for liquid material as claimed in claim 1, wherein the outer tube connector is composed of an outer tube sealing cap and an inner tube sealing cap integrally connected with the outer tube sealing cap by several supports, the outer tube sealing cap sealing each end of the outer tube and being formed with a water inlet/outlet, the inner tube sealing cap sealing each end of the flow conducting tube and being formed with a through hole, a central connecting rod being passed through the flow conducting tube and the rest bodies and connected between the two inner tube sealing caps, two ends of the connecting rod being locked to firmly assemble the respective components.

8. Magnetizing and activating processing unit for liquid material as claimed in claim 1, wherein the inner end of the connector is formed with a cavity in which a permanent magnet is inlaid.

9. Magnetizing and activating processing unit for liquid material, comprising a flow conducting tube, at least one rest body and an outer tube, wherein:

the flow conducting tube has an internal chamber, a certain length of spiral conducting plate being wound around the flow conducting tube;

the rest body can be placed into the chamber of the flow conducting tube, the rest body being formed with multiple insertion dents in which magnetic members are inlaid; and the outer tube is a sleeve body in which the assembly of the above components is accommodated, the outer circumference of the conducting plate of the flow conducting tube snugly abutting against inner wall face of the outer tube, an outer tube sealing cap formed with a through hole sealing each open end of the outer tube, a connecting rod being passed through the through holes of the sealing caps, two ends of the connecting rod being tightened, the outer tube being formed with water inlet and outlet near the open ends, whereby a fluid can flow into one water inlet/outlet of the outer tube and then pass through the flow way between the conducting plate and the inner wall face of the outer tube and then flow out from the other water inlet/outlet of the outer tube.

10. Magnetizing and activating processing unit for liquid material as claimed in claim 9, wherein the rest bodies have multistage pattern.

11. Magnetizing and activating processing unit for liquid material as claimed in claim 9, wherein the magnetic members have multistage pattern.

* * * * *